3,293,294
α-CARBOXAMIDOMETHYLAMINO-
CARBOXAMIDES
Duff Shederic Allen, Jr., Dobbs Ferry, and Edward Rudolph Ruso, Nanuet, N.Y., and Sidney A. Frankel, Edison, N.J., assignors to American Cyanamid Company, Stamford, Conn., a corporation of Maine
No Drawing. Filed Sept. 28, 1965, Ser. No. 491,032
3 Claims. (Cl. 260—558)

This application is a continuation-in-part of our copending application Serial No. 303,410, filed August 20, 1963.

This invention relates to new intermediates useful in a process of preparing 3 - disubstituted - 2,6 - piperazinediones.

The novel intermediate compounds of the present invention may be represented by the following formula:

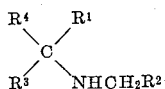

wherein $R^1$ and $R^2$ are carboxamido; $R^3$ is lower alkyl and $R^4$ is phenyl, or halophenyl and acid addition salts thereof.

In the above formula, the term "lower alkyl" is intended to embrace hydrocarbon radicals having 1 to 6 carbon atoms such as, for example, methyl, ethyl, n-propyl, isopropyl, n-butyl, isobutyl and the like. The term halophenyl is intended to include chlorophenyl, bromophenyl, fluorophenyl and iodophenyl. The present compounds when treated with an acid will form acid addition salts such as hydrochloride, hydrobromide, sulfate, nitrate, etc.

The α-carboxamidomethylaminocarboxamide intermediates of this invention are in general crystalline solids which are somewhat soluble in the usual organic solvents and relatively insoluble in water.

The α-carboxamidomethylaminocarboxamide intermediates of this invention may be prepared from α-cyanomethylaminonitrile and α-carboxamidomethylaminonitrile intermediates (i.e., those intermediates wherein $R^1$ would be cyano and $R^2$ would be cyano or carboxamido) by conventional hydrolysis. Usually the starting intermediate is dissolved in concentrated sulfuric acid and after a short time the sulfuric acid solution is poured into cracked ice causing the product to separate. The crude product may be purified by conventional methods of crystallization.

The α-carboxamidomethylaminocarboxamide intermediates of the present invention may be cyclized to the corresponding 3-lower alkyl-3-phenyl or halophenyl 2,6-piperazinediones by heating the starting intermediates to a temperature within the range of from about 180° C. to about 250° C. for a period of time from about ½ to about 4 hours. Usually a solvent is not necessary since the starting compound melts at the elevated temperature and cyclizes with evolution of ammonia. The piperazinediones may also be prepared by treating the present intermediates with an alkali metal oxide in an anhydrous solvent at a temperature within the range of from about 15° to about 120° C. for a period of time of from about ½ hour to 24 hours.

A number of the intermediates described hereinafter in the examples are useful in an improved process for preparing 3-lower alkyl-3-mononuclear aryl-2,6-piperazinediones as described and claimed in our copending application Serial No. 303,411 filed August 20, 1963.

The 3-lower alkyl-3-phenyl or halophenyl 2,6-piperazinediones prepared from the intermediates of the present invention have valuable central nervous system depressant activity. For example, the compound 3-ethyl-3-phenyl-2,6-piperazinedione when tested in mice shows a reduction of spontaneous motor activity more effective than that produced by meprobamate (a recognized tranquilizer). In a similar test the above compound when compared with phenobarbital (a recognized hypnotic) shows a tranquilizing action whereas phenobarbital exhibits no such action. In general, the 3-lower alkyl-3-phenyl or halophenyl-2,6-piperazinediones when tested in mice show the activity of hypnotics, tranquilizers and muscle relaxant properties in warm-blooded animals.

The following examples illustrate in greater detail the preparation of a number of intermediates and their conversion to 3-lower alkyl-3-phenyl or halophenyl-2,6-piperazinediones.

EXAMPLE I

Preparation of 2-[(α-cyano-α-ethylbenzyl)amino]
acetamide

A mixture of 62 ml. of anhydrous methanol, 16.6 g. (0.124 mole) of propiophenone, 6.4 g. (0.130 mole) of granular sodium cyanide and 17.7 g. of 85% glycinamide hydrochloride (0.136 mole) is stirred for 18 hours at 25°–30° C. in a closed flask. The mixture is heated at 60° C. for 6 hours, then cooled to 30° C. and filtered to remove inorganic insolubles. Concentration of the filtrate under reduced pressure gives an amber colored oily residue to which is added 175 ml. of benzene. The mixture is filtered to remove insolubles and the filtrate is concentrated under reduced pressure. To the oily residue is added 75 ml. of ether and 75 ml. of petroleum ether. After stirring for one hour the product is separated by filtration to give 20.1 g. (75% of theory) of pale tan crystals, melting point 79°–83° C. A sample from a similar experiment is recrystallized repeatedly from benzene-petroleum ether to give a colorless solid, melting point 87°–89° C.

EXAMPLE II

Preparation of 2-[(carbethoxymethyl)amino]-2-phenylbutyronitrile hydrochloride

A mixture of 30.7 g. (0.22 mole) of ethyl glycinate hydrochloride, 10.6 g. (0.21 mole) of granular sodium cyanide, 26.8 g. (0.20 mole) of propiophenone (melting point 19°–21° C.) in 100 ml. of anhydrous methanol is stirred for 22 hours at 25–30° C. in a closed flask. The mixture is heated at 60°–62° C. for 6 hours, then cooled to 25° C. and filtered to remove inorganic insolubles. Concentration of the filtrate under reduced pressure gives a yellow oily residue to which is added 200 ml. of ether. The mixture is filtered and the filtrate is treated with excess anhydrous hydrogen chloride. A colorless crystalline solid is separated by filtration and amounts to 50.7 g. (88% of theory), melting point 111.5°–115.5° C.

EXAMPLE III

Preparation of 2-[(carbamoylmethyl)amino]-2-phenylbutyramide

A solution of 53 g. (0.25 mole) of 2-cyanomethylamino-2-phenylbutyronitrile in 100 ml. of reagent grade concentrated sulfuric acid is stirred for 2 hours at 20–30° C. The solution is poured into a stirred mixture of 500 ml. of chloroform and 500 g. of ice. The mixture is made alkaline (pH 8) by the addition of concentrated ammonium hydroxide and the product is separated by filtration, washed with water and dried at 80°. A total of 32 g. of tan colored prisms, melting point 159–162° is obtained.

EXAMPLE IV

*Preparation of 2-[(α-cyano-α-methylbenzyl)amino]-acetamide*

A mixture of 62 ml. of anhydrous methanol, 14.9 g. (0.124 mole) of acetophenone, 6.7 g. (0.137 mole) of granular sodium cyanide and 19.1 g. of glycinamide hydrochloride (0.173 mole) is stirred for 18 hours at 25°–30° C. in a closed flask. The mixture is heated at 60° C. for 6 hours, then cooled to 30° C. and filtered to remove inorganic insolubles. Concentration of the filtrate under reduced pressure gives an oil to which is added 400 ml. of isopropyl alcohol. The mixture is filtered and the filtrate is concentrated under reduced pressure to give an oily residue which on treatment with ether-petroleum ether produces a solid crude product. Several crystallizations of this material form benzene-petroleum ether gives 5.0 g. of off-white solids, melting point 84°–85° C.

EXAMPLE V

*Preparation of 2-[(α-cyano-α-n-amylbenzyl)amino]-acetamide*

35.3 g. (0.200 mole) hexanephenone, 31.2 g. (24.3 g. real; 0.220 mole) glycinamide hydrochloride, 10.3 g. (0.210 mole) sodium cyanide and 150 ml. reagent methanol are charged to a 450 ml. Parr pressure bottle containing a magnetic stirring bar. The bottle is sealed by clamping a rubber stopper (through which a thermometer has been inserted) to the bottle. The mixture is stirred overnight at (16–20 hours) room temperature and then at 60°–65° C. for 6 hours. The reaction mixture is cooled to room temperature, the bottle opened and the contents filtered. The filter cake is washed with three 50 ml. portions of methanol. The filtrate and washes are combined and concentrated by evaporation to a mixture of an oil and a small amount of solid. The residue is treated with about 200 ml. of benzene and a small amount of undissolved solid removed by filtration. The filtrate is concentrated on a rotary evaporator to a light amber colored oil, which is dissolved in about 100 ml. of diethyl ether. The ether solution is stirred vigorously and diluted slowly with 300 ml. of petroleum ether (30°–60°) to a persistent haze. Within a few minutes a tan solid begins to separate. The mixture is stirred at room temperature overnight. The product is collected by filtration, washed with three 100 ml. portions of petroleum ether (30°–60°), and air dried to a constant weight of 29.5 g. (57.0%). The crude product, which is not further purified, melts at 88°–90° C.

EXAMPLE VI

*Preparation of 2-amino-2-phenyl propionitrile hydrochloride*

A solution of 11.9 g. (0.700 mole) anhydrous ammonia in 100 ml. of methanol is placed in a 450 ml. Parr pressure bottle containing a magnetic stirrer bar. To the bottle is added 42.0 g. (0.350 mole) acetophenone, 20.6 g. (0.385 mole) ammonium chloride, 18.0 g. (0.368 mole) sodium cyanide and 50 ml. methanol and the bottle sealed with a rubber stopper, through which a thermometer is inserted. The mixture is stirred for 16–20 hours at room temperature and then at 60°–65° C. for 5–6 hours. After cooling to room temperature the bottle is opened and the contents filtered. The cake is washed with three 50 ml. portions of methanol. The combined filtrate and washes are concentrated on a rotary evaporator to an amber oil. The oil is treated with about 500 ml. of diethyl ether and a small amount of undissolved solid is removed by filtration. The filtrate is decolorized with activated charcoal, filtered and gased with anhydrous hydrogen chloride. A white solid separates almost immediately. The product is collected by filtration, washed with three 100 ml. portions of diethyl ether and air dried to a constant weight of 44.8 g. (70%). The product melts at 110°–112.5° (an analytically pure sample melted at 113°–113.5° C.).

EXAMPLE VII

*Preparation of 2-amino-2-phenyl butyronitrile hydrochloride*

A solution of 11.9 g. (0.700 mole) of ammonia in 100 ml. of methanol is charged to a 450 ml. Parr pressure bottle containing a magnetic stirrer bar. To this is added 47.0 g. (0.350 mole) propiophenone, 20.6 g. (0.385 mole) ammonium chloride, 18.0 g. (0.368 mole) sodium cyanide and 50 ml. methanol and the bottle sealed with a rubber stopper, through which a thermometer has been inserted. The mixture is stirred at room temperature overnight (16–20 hours) and then at 60° C. (±3°) for about 6 hours. After cooling to room temperature the bottle is opened and the contents filtered. The cake is washed with three 50 ml. portions of methanol. The combined filtrate and washes are concentrated under an air draft to an amber oil. The residue is treated with about 500 ml. of diethyl ether. A very small amount of solid remains undissolved. The mixture is treated with activated charcoal and filtered. The cake is washed with three 50 ml. portions of ether. The combined filtrate and washes are gassed with anhydrous hydrogen chloride. A white solid precipitated immediately, is collected by filtration, and washed with three 100 ml. portions of ether. The product is air dried to a constant weight of 58.1 g. (84.5%) and melts at 128°–130° C. (analytically pure material is reported to melt at 129°–130° C.).

EXAMPLE VIII

*Preparation of 2-amino-2-phenylbutyronitrile hydrochloride*

107 g. (2.00 moles) of ammonium chloride, 245 ml. (3.68 moles) of 28% aqueous ammonia, 244 g. (1.82 moles) of propiophenone, 550 ml. of ethanol, 118 g. (1.82 moles) of potassium cyanide and 440 ml. of water are charged into a reaction flask in the above order. The flask is sealed, the mixture stirred at room temperature for about one hour and then heated at 60°–65° C. overnight. The reaction mixture is cooled to below 20° C., the flask is opened, 15–20 g. of activated charcoal is added and the slurry is stirred for one-half hour and filtered through diatomaceous earth; the filter cake is washed with four 100 ml. portions of ethanol. The filtrate and washes are combined and concentrated under reduced pressure on a steam bath to a mixture of oil and solid. About one liter of benzene is added and the mixture again concentrated to a mixture of oil and solid; this process is repeated with an additional one liter of benzene. A quantity of 1.5 liters of benzene is added, 500–750 ml. of solvent is removed by distillation and 20 g. of activated charcoal is adedd to the residue. This mixture is stirred at 40°–50° C. for 15 minutes, filtered through diatomaceous earth and the filter cake washed with three 75 ml. portions of benzene. The combined filtrate and washes are dried over magnesium sulfate and activated charcoal for about an hour and filtered through diatomaceous earth. Anhydrous hydrogen chloride is passed into the filtrate for one half hour; a tan solid separated within 2–3 minutes. This crude product is collected, slurried in 750 ml. of anhydrous diethyl ether, filtered and the cake washed with three 200 ml. portions of diethyl ether. After air drying overnight, the product weighs 115 g. (43%) and melted at 126°–129° C., analytically pure material melts at 129°–130° C.

EXAMPLE IX

*Preparation of 2-amino-2-phenylvaleronitrile hydrochloride*

84.5 g. (1.58 moles) of ammonium chloride, 190 ml. (2.86 moles) of concentrated ammonium hydroxide, 214 ml. (211 g., 1.43 moles) of n-butyrophenone, 430 ml. of ethanol, 93.0 g. (1.43 moles) of potassium cyanide and 350 ml. of water are added to a reaction flask in the above order, the flask is sealed, the mixture is stirred at room temperature for one hour and then at 60°–65° C. for about 18–20 hours. After cooling to less than 20° C., the flask is opened in a hood, the mixture is filtered through diatomaceous earth and the cake is washed with three 100 ml. portions of ethanol. Washes and filtrate are combined and concentrated at reduced pressure on a steam bath to yield an oily solid. This residue is dried by addition of one liter of benzene to the residue and concentration of the mixture to an oily solid. The solid is taken up in 1.5 liters of benzene, 20 g. of activated carbon is added and the mixture is stirred at room temperature for ½ hour. Solids are removed by filtration through diatomaceous earth and the cake is washed with four 50 ml. portions of benzene. The filtrate and washes are combined and concentrated on a steam bath at atmospheric pressure until the vapor temperature reached 81° C. Then the distillate comes over clear (about 1 liter of benzene has distilled). This residue is again treated with 500 ml. of benzene and an additional 200–250 ml. of benzene is removed by distillation. The residual benzene solution is dried for one hour over magnesium sulfate, treated with activated carbon, filtered through diatomaceous earth and the cake washed with three 50 ml. portions of benzene. The combined filtrate and washes are cooled in an ice-water bath and treated with anhydrous hydrogen chloride for about ½ hour. A light tan colored solid precipitates within 4–5 minutes. The crude product is collected, slurried in 1.50 liters of reagent diethyl ether and insolubles isolated by filtration. The product is washed on the filter with three 100 ml. portions of ether. After air drying overnight, 96.0 g. of product, melting point 124°–126.5° C. with decomposition is obtained.

EXAMPLE X

*Preparation of 2-amino-2-phenyl capronitrile hydrochloride*

A solution of the ammonia in 100 ml. of the methanol is charged to a 450 ml. Parr pressure bottle containing a magnetic stirrer bar. To this is added 52.6 g. (0.325 mole) of valerophenone, 11.2 g. (0.657 mole) of anhydrous ammonia, 19.1 g. (0.357 mole) of ammonium chloride, 15.9 g. (0.325 mole) of sodium cyanide and 50 ml. of methanol and the bottle sealed with a rubber stopper, through which a thermometer has been inserted. The mixture is stirred for one hour at room temperature and then at 60°–61°C. overnight (16–18 hours). The mixture is chilled to about 15° C., the bottle opened, and the contents filtered. The cake is washed with three 50 ml. portions of methanol. The filtrate and washes are combined and concentrated on a rotary evaporator to a mixture of oil and solids. The mixture is treated with about 250–300 ml. of diethyl ether, 5–6 g. of activated charcoal and filtered. The cake is washed with three 50 ml. portions of ether. The filtrate and washes are combined and treated with anhydrous hydrogen chloride. With 1–2 minutes a dense white precipitate is formed and 250 ml. portion of ether is added. The product is collected by filtration, washed with ether and air dried to a constant weight of 55.0 g. (75.5%). The material melts at 123.5°–126° C. and an analytically pure sample at 124.5°–126° C.

EXAMPLE XI

*Preparation of 2-amino-2-phenylcapronitrile hydrochloride*

107 g. (2.00 moles) of ammonium chloride, 245 ml. (3.68 moles) of 28% aqueous amonia, 295 g. (1.82 moles) of valerophenone, 550 ml. of ethanol, 440 ml. of water and 118 g. (1.82 moles) of potassium cyanide are added to a reaction flask in the above order and the flask is sealed and then heated at 60°–65° C. for 20 hours. After cooling the dark reaction mixture to less than 10° C., the flask is opened and 25 g. of activated charcoal is added. This mixture is stirred at room temperature for about a half hour then filtered through diatomaceous earth and the cake is washed with three 100 ml. portions of ethanol. Filtrate and washes are combined and concentrated on a steam bath under aspirator vacuum to an oily solid residue. A quantity of 1.5 liters of diethyl ether and 50 g. of activated charcoal are added to the residue and this mixture is stirred at 25° C. for a half hour before it is filtered through diatomaceous earth. The cake is washed with four 100 ml. portions of diethyl ether. Combined filtrate and washes are allowed to stand over magnesium sulfate for an hour, solids are removed and washed with three 50 ml. portions of ether. The filtrate and washes are combined, chilled in an ice-acetone bath, and treated with anhydrous hydrogen chloride. The crude hydrochloride precipitated as a tan granular solid within 3–4 minutes. The solid is collected by filtration and washed with four 100 ml. portions of anhydrous diethyl ether. After air drying a total of 84.0 g. of product is obtained (melting point 113°–115.5° C.).

EXAMPLE XII

*Preparation of 2-cyanomethylamino-2-phenylpropionitrile*

20.1 g. (0.110 mole) of 2-amino-2-phenylpropionitrile hydrochloride, 150 ml. of reagent methanol, 7.6 ml. (ca. 0.100 mole) of 37–40% aqueous formaldehyde and 5.14 g. (0.105 mole) of sodium cyanide are charged into a 450 ml. Parr pressure bottle containing a magnetic stirring bar. The bottle is sealed by the clamping of a rubber stopper, through which a thermometer has been inserted to the bottle. The mixture is stirred overnight (16–20 hours) at room temperature then at 60° C. (±3° C.) for 5½ hours. The mixture is cooled to room temperature, bottle opened and the contents treated with about 4 g. of activated charcoal. The charcoal and insolubles are removed by filtration and the cake washed with three 50 ml. portions of methanol. The filtrate and washes are combined and concentrated under an air draft overnight. The residue of oil and solid is treated with 200 ml. of diethyl ether and 5 g. of activated charcoal. The mixture is filtered through diatomaceous earth. The filter cake is washed with three 50 ml. portions of diethyl ether. The filtrate and washes are combined and concentrated on a rotary evaporator to an amber oil. The concentration is continued until the weight of product remained constant (17.0 g., 92.0%).

EXAMPLE XIII

*Preparation of 3-ethyl-3-phenyl-2,6-piperazinedione*

A mixture of 2.01 g. (0.0093 mole) of 2-[(α-cyano-α-ethylbenzyl)amino]-acetamide (melting point 80°–85° C.) and 0.707 g. (0.0131 mole) of sodium methylate in 17 ml. of anhydrous ethanol is stirred at 25°–30° C. for 16 hours. The solvent is evaporated under reduced pressure and the residue is dissolved in 17 ml. of water. The aqueous solution is acidified with 1 ml. of glacial acetic acid and 25 drops of concentrated hydrochloric acid, stirred for 1 hour at 25°–30° C. and then neutralized with dilute ammonium hydroxide. The product is isolated by filtration and amounts to 1.05 g. (52% of theory) of tan crystalline solid, melting point 115°–118° C., undepressed (116°–118° C.) on admixture with authentic material.

EXAMPLE XIV

*Preparation of 3-ethyl-3phenyl-2,6-piperazinedione*

A mixture of 12.0 g. (0.051 mole) of 2-[(carbamoylmethyl)amino]-2-phenylbutyramide (melting point 159°–162° C.) and 3.5 g. (0.065 mole) of sodium methylate in 100 ml. of absolute ethyl alcohol is heated at reflux for 2 hours, the system being protected from moisture by a calcium chloride drying tube. The pale yellow solution is cooled to room temperature and concentrated under reduced pressure. A solution of the oily residue in 100 ml. of water is neutralized by the addition of 2.6 ml. of glacial acetic acid. The product is separated by filtration and amounts to 1.2 g. (10% of theory) of a tan crystallized solid, melting point 113°–116° C., undepressed (melting point 112°–115° C.) on admixture with authentic material.

EXAMPLE XV

*Preparation of 3-ethyl-3phenyl-2,6-piperazinedione*

A sample of 2.0 g. of 2-[carbamoylmethyl)amino]-2-phenylbutyramide is heated at 200°–230° C. for 0.5 hour during which time ammonia is evolved. The system is placed under reduced pressure and heating is continued for an additional 0.5 hour. The product is cooled at 30° C. and dissolved in acetone. Evaporation of the solvent gives 1.78 g. (96% of theory) of prisms, melting point 115°–120° C.

EXAMPLE XVI

*Preparation of 2-[(carbamoylmethyl)amino]-2-phenylbutyramide*

A solution of 25 g. (0.12 mole) of [(α-cyano-α-ethylbenzyl)amino]-acetamide in 50 ml. of reagent grade concentrated sulfuric acid is stirred for 0.5 hour at 20–30° C., then poured slowly into a stirred mixture of 200 ml. chloroform and 200 g. of ice. The mixture is made alkaline (pH 8) by the addition of 185 ml. of concentrated ammonium hydroxide. After the addition of 50 ml. of chloroform the product is separated by filtration, washed with water and dried at 80° C. A total of 19.4 g. (72% of theory) of colorless prisms melting point 160°–162° C. is obtained.

EXAMPLE XVII

*Preparation of 2-carbamylmethylamino-2-phenylcapronitrile*

32.4 g. (0.200 mole) of valerophenone, 23.9 g. (0.216 mole) of glycinamide hydrochloride, 10.3 g. (0.210 mole) of sodium cyanide and 100 ml. of methanol are charged into a 450 ml. Parr pressure bottle containing a magnetic stirrer bar. The bottle is sealed tightly with a rubber stopper through which a thermometer has been inserted. The mixture is stirred overnight at room temperature and then at 60°–65° C. for about 6 hours. The reaction mixture is cooled to about 10° C., the bottle opened, and the contents filtered. The cake is washed with three 50 ml. portions of methanol. The filtrate and washes are combined and concentrated under an air draft to a mixture of oil and solid. The residue is treated with 200 ml. of benzene, stirred at room temperature for one hour and the insoluble solid separated by filtration. The cake is washed with three 75 ml. portions of benzene. The combined filtrate and washes are concentrated on a rotary evaporator to an amber oil, which is dissolved in 100 ml. of diethyl ether. The ether solution is stirred vigorously while being diluted slowly with 300 ml. of 30°–60° C. petroleum ether to a persistent haze. Within ½ hour a thick precipitate of tan solid forms. The solid is collected by filtration, washed well with petroleum ether and air dried to a constant weight of 33.6 g. (80.5%) of material which melted at 56°–62° C. The purified material melts at 61°–65° C.

EXAMPLE XVIII

*Preparation of 2-([α-cyano-α-methyl-(p-chlorobenzyl)]amino)acetamide*

A mixture of 124 ml. of anhydrous methanol, 38.2 g. of p-chloroacetophenone, 12.8 g. of granular sodium cyanide and 30.0 g. of glycinamide hydrochloride is stirred for 18 hours at 25°–30° C. in a closed flask. The mixture is heated at 60° C. for 6 hours, then cooled to 30° C. and filtered to remove inorganic insolubles. Concentration of the filtrate under reduced pressure gives an oily residue to which is added 350 ml. of benzene. The mixture is filtered to remove insolubles and the filtrate is concentrated under reduced pressure. To the oily residue is added 200 ml. of ether. The product is separated by filtration to give 7.0 g. of colorless solids, melting point 87°–91° C.

EXAMPLE XIX

*Preparation of 2-([α-cyano-α-methyl-(m-chlorobenzyl)]amino)acetamide*

A mixture of 80 ml. of anhydrous methanol, 38.2 g. of m-chloroacetophenone, 12.8 g. of granular sodium cyanide and 30.0 g. of glycinamide hydrochloride is stirred for 18 hours at 25°–30° C. in a closed flask. The mixture is heated at 60° C. for 6 hours, then cooled to 30° C. and filtered to remove inorganic insolubles. Concentrations of the filtrate under reduced pressure gives an oil to which is added 350 ml. of benzene. The mixture is filtered to removed insolubles and the filtrate is concentrated under reduced pressure. To the oily residue is added 200 ml. of ether. The product is separated by filtration to give 29.3 g. (50% of theory) of tan crystals, melting point 84–90° C.

EXAMPLE XX

*Preparation of 2-([α-cyano-α-ethyl-(p-chlorobenzyl)]amino)acetamide*

A mixture of 42 ml. of anhydrous methanol, 20.8 g. of p-chloropropiophenone, 6.4 g. of granular sodium cyanide and 17.9 g. of 84% glycinamide hydrochloride is stirred for 18 hours at 25°–30° C. in a closed flask. The mixture is heated at 60° C. for 6 hours, then cooled to 30° C. and filtered to removed inorganic insolubles. Concentration of the filtrate under reduced pressure gives amber colored oily residue to which is added 175 ml. of benzene. The mixture is filtered to remove insolubles and the filtrate is concentrated under reduced pressure. To the oily residue is added 25 ml. of ether and 45 ml. of petroleum ether. The product is separated by filtration to give 22.7 g. (73% of theory) of pale yellow crystals, melting point 72°–75° C. A sample from a similar experiment is recrystallized repeatedly from benzene-petroleum ether to give a colorless solid, melting point 83°–85° C.

EXAMPLE XXI

*Preparation of 2-[(carbamoylmethyl)amino]-2-p-chlorophenylpropionamide*

A solution of 7.6 g. of 2-([α-cyano-α-methyl-(p-chlorobenzyl)]amino)-acetamide in 15.0 ml. of reagent grade concentrated sulfuric acid is stirred for 0.5 hours at 20°–30° C., then poured into a stirred mixture of 30 ml. of chloroform and 30 ml. of ice. The mixture is made alkaline (pH 8) by the addition of 43 ml. of concentrated ammonium hydroxide. The product is separated by filtration to give 7.9 g. (98% of theory) of colorless solids, melting point 102°–104° C.

EXAMPLE XXII

*Preparation of 2-([α-cyano-α-methyl-(3,4-dichlorobenzyl)]amino)acetamide*

A mixture of 25 ml. of anhydrous methanol, 11.7 g. of 3′, 4′-dichloroacetophinone, 3.2 g. of granular sodium cyanide and 9.0 g. of 84% glycinamide hydrochloride is stirred for 18 hours at 25°–30° C. in a closed flask. The mixture is heated at 60° C. for 6 hours, then cooled to 30° C. and filtered. Concentration of the filtrate under pressure gives an oily residue to which is added 100 ml. of benzene. The mixture is filtered and the filtrate is concentrated under reduced pressure. Ethyl ether and petroleum ether is added to the oily residue and the pale yellow crystalline product is isolated by filtration.

EXAMPLE XXIII

*Preparation of 2([α-cyano-α-methyl-(3,4-dimethylbenzyl)]amino)acetamide*

A mixture of 124 ml. of anhydrous methanol, 36.7 g. of 3',4'-dimethylacetophenone, 12.8 g. of granular sodium cyanide and 39.2 g. of 76% glycinamide hydrochloride is stirred for 18 hours at 25°–30° C. in a closed flask. The mixture is heated at 60° C. for 6 hours, then cooled to 30° C. and filtered. Concentration of the filtrate under reduced pressure gives an oily residue to which is added 300 ml. of benzene. The mixture is filtered and the filtrate is concentrated under reduced pressure. To the oily residue is added diethyl ether. The pale yellow crystalline product, melting point 85°–93° C., is isolated by filtration.

EXAMPLE XXIV

*Preparation of 2-([α-cyano-α-methyl-(m-α,α,α-trifluoromethylbenzyl)]amino)acetamide*

A mixture of 124 ml. of anhydrous methanol, 46.5 g. of m-α,α,α-trifluoromethylacetophenone, 12.8 g. of granular sodium cyanide and 39.2 g. of 76.6% glycinamide hydrochloride is stirred for 18 hours at 25°–30° C. in a closed flask. The mixture is heated at 60° C. for 6 hours, then cooled to 30° C. and filtered. Concentration of the filtrate under reduced pressure gives an oily residue to which is added 300 ml. of benzene. The mixture is filtered and the filtrate is concentrated under reduced pressure. To the oily residue is added diethyl ether. The off-white crystalline product, melting point 114°–119° C. is isolated by filtration.

We claim:
1. A compound of the formula:

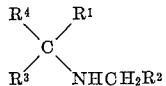

wherein $R_1$ and $R_2$ are carboxamido, $R_3$ is lower alkyl and $R_4$ is selected from the group consisting of phenyl and halophenyl and acid addition salts selected from the group consisting of hydrochloride, hydrobromide, sulfate and nitrate.

2. The compound 2 - [(carbamoylmethyl)amino] - 2 - 2-phenylbutyramide.

3. The compound 2-[(carbamoylmethyl) - amino] - 2 - p-chlorophenyl propionamide.

References Cited by the Examiner
UNITED STATES PATENTS
2,786,836   3/1957   Skinner et al. _____ 260—558

WALTER A. MODANCE, *Primary Examiner.*

N. TROUSOF, *Assistant Examiner.*